May 1, 1956 C. E. HANSON, JR., ET AL 2,743,714
BEARING
Filed May 4, 1953 2 Sheets-Sheet 1

INVENTORS
Clarence E. Hanson Jr. &
BY Paul L. Vermaire
S. C. Thorpe
ATTORNEY

May 1, 1956  C. E. HANSON, JR., ET AL  2,743,714
BEARING

Filed May 4, 1953  2 Sheets-Sheet 2

INVENTORS
Clarence E. Hanson Jr. &
BY Paul L. Vermaire
J. C. Thorpe
ATTORNEY

United States Patent Office 2,743,714
Patented May 1, 1956

2,743,714
BEARING

Clarence E. Hanson, Jr., and Paul L. Vermaire, Grand Rapids, Mich., assignors to General Motors Corporation, Detroit, Mich., a corporation of Delaware Application May 4, 1953, Serial No. 352,822

7 Claims. (Cl. 123—90)

The present invention relates to bearings of the type generally characterized as anti-friction bearings for accommodating relative rotation between two parts which in normal use have only small amplitudes of intermittent rotation relative to each other about a common axis, and wherein such relative rotation is effected by driving means operatively engaging one of the parts through a one-way clutch device and it is desired to prevent retrograde rotation of the driven part during the return stroke of the driving means independently of the driven part.

While there are of course numerous uses and applications for such bearings, a preferred embodiment of the invention as applied to its use in a bearing of a poppet valve rotating device has been selected for purposes of illustration.

It is accordingly an object of the invention to provide an improved bearing having means accommodating substantially unrestrained rotation between two parts and means for snubbing against the parts to prevent undesired relative rotation between the parts.

It is a further and more specific object of the invention to provide a bearing between two relatively rotatable parts which will accommodate such relative rotation with the desired degree of freedom in response to positive driving effort being applied to one of the parts in one rotary direction and which will effectively restrain undesired rotation between the parts either in the same or opposite direction between applications of such driving efforts.

A still further object of the invention is to provide a bearing adapted to accommodate small amplitudes of relative rotation between two parts including an element having an anti-friction connection with and accommodating relative rotation of the parts and a snubber element having sufficient frictional engagement with the parts in a manner to accommodate their relative rotation with the desired degree of freedom while one of the parts is positively being driven and still restrain their relative rotation with sufficient force when the first force is removed.

The means by which these and other objects of the invention are obtained will be more readily understood from the following description of the invention as applied to a valve rotating device of an internal combustion engine, having reference to the drawings wherein.

Figure 3:
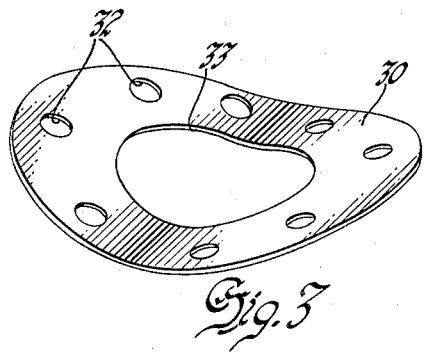
Figure 3 is a perspective view of the bearing cage element removed from the bearing of Figure 2.
Figure 4:
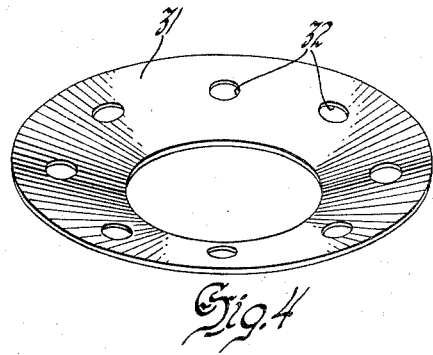
Figure 5:
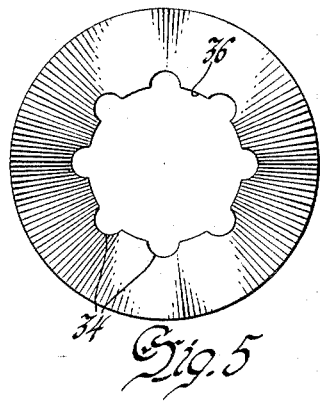
Figure 6:
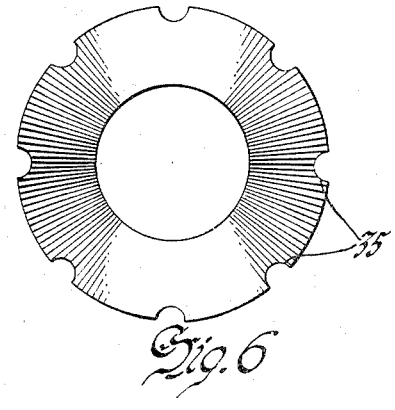

Figures 4, 5, and 6 show modified forms of the cage element of Figure 3, Figure 4 being a perspective view and Figures 5 and 6 being in plan.

Figure 1:
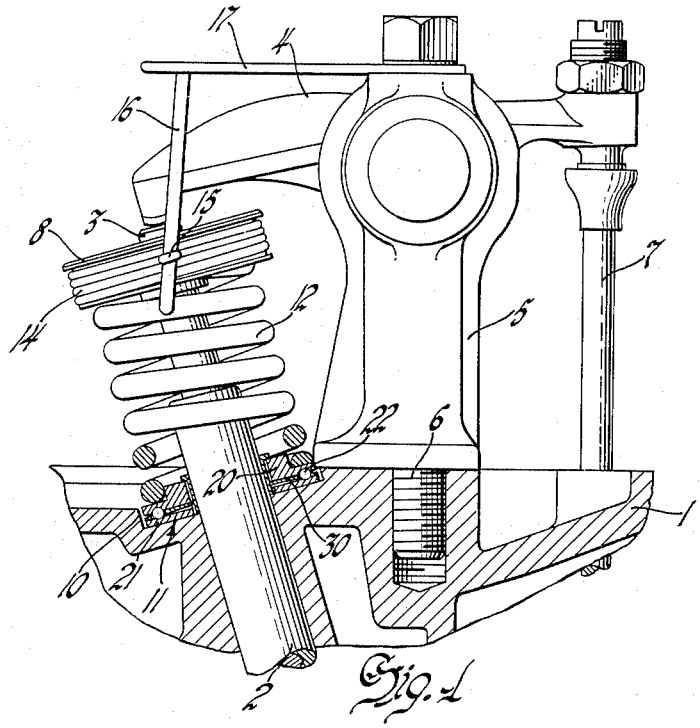
Figure 1 is a fragmentary sectional-elevational view of the overhead valve operating mechanism of an internal combustion engine, incorporating a valve rotating device using our improved bearing.

Referring now to Figure 1 there is shown a portion of an internal combustion engine cylinder head 1 in which is fixedly mounted a poppet valve guide 2 for slidably and rotatably supporting the stem 3 of a poppet valve whose lower head end (not shown) may control the opening and closing of an inlet or exhaust port in conventional manner. Also shown is a valve rocker 4 pivotally mounted on a pedestal 5 which is secured to the top of the cylinder head as by the stud 6, with one end of the rocker being drivingly connected to the valve stem 3 and the other end suitably linked to a push rod 7 which in turn is reciprocably driven in any desired manner as by an engine driven cam (not shown) at its lower end. Fixedly secured to the valve stem 3 adjacent its upper end is a retainer in the form of a washer 8. The face of the cylinder head 1 surrounding the guide 2 is formed with a recess 10 in which is seated one form of our improved bearing, generally indicated by the reference numeral 11, and compressed between this bearing and the washer 8 is a helical valve return spring 12. In conventional manner, the return spring 12 opposes opening movements of the valve, which as viewed in Figure 1 are produced by counterclockwise rotation of the rocker 4 in response to upward movements of the push rod 7. As a means for introducing axial rotation of the valve stem in response to its reciprocation we have shown the external periphery of the retainer washer 8 snugly embraced by a coil spring 14 having one of its ends terminating in an out-turned loop portion 15. Extending slidably through this loop 15 is a pin 16 rigidly supported on the cylinder head by a bracket 17 extending from the pedestal 5. The pin 16 makes an acute angle with the axis of the clutch spring 14, whereby as the clutch spring reciprocates it is caused to rotate about its axis in alternately opposite directions. By having the convolutions of the clutch spring engage the periphery of the washer 8 with sufficient tightness (in the order of a—.001 in. diametral clearance therebetween) the rotation of the clutch spring in one direction causes it to grip and rotatably drive the washer and valve stem in the same direction, while rotation of the clutch spring in the opposite direction results in the clutch spring slipping on the washer 8 with no rotation imparted to the valve stem.

It will be appreciated that various other one-way driving and clutching arrangements may be employed for effecting valve rotation, the particular means shown being more fully described in the pending U. S. application of Dadd and Vermaire, Serial No. 282,042, filed April 12, 1952, now Patent No. 2,664,076.

Figure 2:
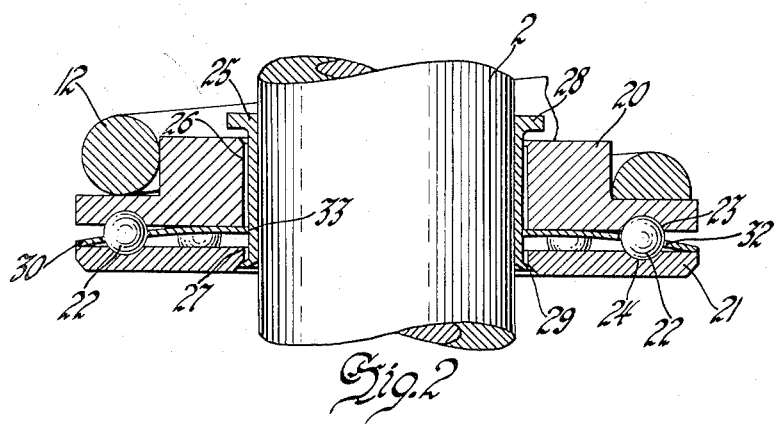
Figure 2 is an enlarged fragmentary view, similar to Figure 1 showing the elements of our bearing in greater detail.

The bearing 11 thrustably supports the valve return spring 12 and serves to accommodate its rotation with the washer 8 and valve stem 3, substantially unrestrained by the cylinder head 1. Because of the fact, however, that the washer imposes some frictional resistance to the clutch spring 14 being rotated about the periphery of the latter in the non-engaged direction there tends to be a slight retrograde rotation imparted to the valve stem which reduces the effective stroke of the clutch spring during each operating cycle. To provide necessary freedom for rotation of the valve in the "positive" direction, that is, when the clutch spring is rotated in the direction in which it is intended to frictionally grip the retainer washer 8, the bearing 11 is provided with spaced apart bearing races 20 and 21 which respectively abut the bottom end of the return spring 12 and the end wall of the recess 10. Spacing these race members apart are one or more antifriction elements such as the balls 22 which roll in suitable track-ways 23 and 24 formed in the oppositely facing surfaces of the race members. Both race members 20 and 21 encircle the valve guide 2 and in the particular construction shown are provided with an interconnecting sleeve 25 which extends through their aligned center openings 26 and 27. The sleeve 25 has a close fit on the periphery of the valve guide 2, and serves to loosely retain the race members together as a self-contained unit facilitating its handling and assembly, the opposite ends of the sleeve being provided with an external flange 28 and an expanded or outwardly spun portion 29 respectively. Retaining the balls in circumferentially spaced apart relation around the track-ways 23 and 24 is a plate-like cage element 30 which as best shown in Figures 2 and 3 is curved or bowed out of the plane of rotation normal to the bearing axis sufficiently that its opposite faces frictionally engage the opposed faces of the race members 20 and 21. The degree of frictional contact desired is only that necessary to restrain retrograde rotation of the upper race 20 with the valve return spring under the relatively light frictional rotative force imparted to the retainer washer 8 while the clutch spring is being indexed to its new position on the return stroke of the valve operating cycle. A certain amount of flexible resilience is therefore desired in the cage element 30, and for this purpose spring steel is suggested as a suitable material therefor.

The cage element 30 may have a single direction of curvature as illustrated in Figure 3, or it may be of dished shape such as shown in the case of the cage element 31 in Figure 4. In each of these assemblies the balls are retained in apertures 32 located intermediate the inner and outer peripheral edges of the annular disk, and the central opening 33 thereof pilots on the sleeve 25 to laterally locate the disk with respect to the axis of rotation.

Alternatively, either the inner peripheral margin may be provided with notches 34 as shown in Figure 5 or the outer periphery may be notched as shown at 35 in Figure 6 to retain the balls in spaced apart relation to each other. With the notches formed on the inner periphery as in Figure 5 the central opening 36 is made larger and the external periphery of the sleeve 25 is employed to cooperate in retaining the balls in their proper spaced apart locations circumferentially of the rotary axis. In the case of the Figure 6 modification the side walls of the recess 10 in the cylinder head 1 is employed to cooperate with the disk notches 35 in retaining the balls in their proper spaced positions.

It will be appreciated that while the improved bearing has been shown and described as applied to an anti-thrust bearing between a valve spring and the cylinder head of an internal combustion engine its uses are obviously not limited thereto, but could have general application wherever it is desired to accommodate relative rotation between two parts in relatively small increments while applying sufficient frictional restraint to such rotation as will enable the desired motion to be effected and controlled by means of a one-way clutch in driving relation with one of the members. While various minor modifications in the structure and arrangement of the parts will readily suggest themselves to persons skilled in the art, it is inteded that all such changes as come within the scope of the following claims are to be considered as not departing from the spirit and scope of our invention.

We claim:

1. In a bearing for use between two members having small amplitudes of intermittent relative rotation, an anti-friction element having rolling engagement with each of said members, and a plate-like element having a locating recess for said anti-friction element, said plate-like element being interposed between said members and having sufficient curvature from the plane of their rotation to frictionally snub against each of the members.

2. In a bearing for use between two members having small amplitudes of relative rotation, a plurality of anti-friction elements spacing said members apart and having rolling engagement with their opposing surfaces, and a plate-like element having recesses spacing said anti-friction elements from each other, said plate-like element being interposed between said members and having a curvature from a plane normal to the axis of their rotation sufficient to provide a snubbing frictional engagement between its opposite sides and the respective members.

3. In a bearing structure adapted to accommodate intermittent relative rotation in small amplitudes between two parts, a member fixedly associated with one of said parts and forming a wall extending longitudinally of the axis of relative rotation of said parts, a plate-like element interposed between said parts and having a marginal edge portion terminating in close adjacency to said walls, said marginal edge portion having notches provided therein in spaced-apart relation, and anti-friction elements disposed in said notches and in rolling engagement with each of said parts, said plate-like element being of flexible resilient material and having an initial curvature relative to the plane of relative rotation of the parts sufficient to effect a frictional snubbing engagement of said plate-like element with each of said parts.

4. In combination, a first part mounted for rotation and reciprocation, a second part fixed against rotation and reciprocation with said first part and forming a support and guide therefor, a spring rotatively carried by said first part and reacting against the second part in opposition to relative longitudinal movement in one direction between the parts, said second part having an annular recess surrounding the first part, a first bearing race seated in said recess, a second bearing race in abutment with the spring opposite said first race, a plurality of balls spacedly separating said races apart and accommodating their relative rotation about the axis of the first part, and an annular plate-like element interposed between said races, said plate-like element having holes through which said balls project to engage the races and being sufficiently dish-shaped in transverse section to cause the opposite sides thereof adjacent its radially inner and outer extremities to frictionally drag on the respective races during rotation of said part.

5. The combination recited in claim 4, together with means interconnecting said first and second parts and operable in response to reciprocation of the first part for effecting intermittent rotation of the first part.

6. In a poppet valve rotating device for use on an internal combustion engine or the like having a cylinder head, a poppet valve with a stem reciprocably and rotatably guided in the had, a valve return spring embracing the valve stem, a retainer securing one end of the spring to the valve stem for effecting longitudinal movement of the valve stem in opposition to the return spring, a coil cltuch spring embraceably gripping said retainer and terminating at one of its ends in an out-turned portion, a pin fixed to the head and extending slidably through said portion at an acute angle to the axis of the stem, and a thrust bearing between the opposite end of said return spring and the head, said bearing including a pair of raceways, a plurality of balls spacedly separating said raceways and a cage laterally separating said balls, said cage being in the form of an annular disk and having sufficient curvature from the plane normal to the axis thereof to effect a frictional snubbing engagement thereby with said raceways.

7. In a bearing for use between two members having small amplitudes of intermittent relative rotation, a first element adapted to provide an anti-friction connection between the members accommodating their relative rotation, and a second element having yielding frictional engagement with each of the members opposing their relative rotation, said second element having means restraining lateral displacement of said first and second elements relative to each other.

References Cited in the file of this patent

UNITED STATES PATENTS

| | | | |
|---|---|---|---|
| 739,717 | Reid | Sept. | 22, 1903 |
| 1,341,134 | Keller | May | 25, 1920 |
| 2,364,794 | Koch | Dec. | 12, 1944 |
| 2,581,471 | Doughty | Jan. | 8, 1952 |
| 2,624,323 | Thorne | Jan. | 6, 1953 |

FOREIGN PATENTS

| | | | |
|---|---|---|---|
| 596,901 | Great Britain | Jan. | 13, 1948 |
| 987,289 | France | Apr. | 11, 1951 |